United States Patent
McCaslin et al.

(10) Patent No.: US 8,570,687 B2
(45) Date of Patent: Oct. 29, 2013

(54) COPPER RESIDUAL STRESS RELAXATION REDUCTION MEANS FOR HARD DISK DRIVE SLIDER GIMBALS

(75) Inventors: Martin John McCaslin, Pleasanton, CA (US); Visit Thaveeprungsriporn, Bangkok (TH); Alex Enriquez Cayaban, Fremont, CA (US); Jason Aquinde Gomez, Santa Clara, CA (US)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 13/481,530

(22) Filed: May 25, 2012

(65) Prior Publication Data
US 2012/0229934 A1 Sep. 13, 2012

Related U.S. Application Data

(62) Division of application No. 12/495,323, filed on Jun. 30, 2009.

(60) Provisional application No. 61/091,323, filed on Aug. 22, 2008.

(51) Int. Cl.
*G11B 5/48* (2006.01)
*G11B 21/08* (2006.01)

(52) U.S. Cl.
USPC ........................................ 360/245.9

(58) Field of Classification Search
USPC ............................ 360/245.3, 245.9
See application file for complete search history.

(56) References Cited

U.S. PATENT DOCUMENTS

| | | | |
|---|---|---|---|
| 6,046,887 A | 4/2000 | Uozumi et al. | |
| 6,146,813 A | 11/2000 | Girard et al. | |
| 6,249,404 B1 | 6/2001 | Doundakov et al. | |
| 6,515,832 B1 | 2/2003 | Girard | |
| 6,596,184 B1 | 7/2003 | Shum et al. | |
| 6,697,228 B1 | 2/2004 | Mei et al. | |
| 6,741,426 B2 | 5/2004 | Girard | |
| 6,992,862 B2 * | 1/2006 | Childers et al. | 360/245.3 |
| 6,993,824 B2 * | 2/2006 | Childers et al. | 29/603.03 |
| 7,349,184 B2 | 3/2008 | Erpelding | |
| 7,468,866 B2 * | 12/2008 | Yang et al. | 360/245.9 |
| 7,567,410 B1 | 7/2009 | Zhang et al. | |
| 7,684,154 B2 | 3/2010 | Zeng et al. | |
| 7,701,673 B2 | 4/2010 | Wang et al. | |
| 7,733,607 B2 * | 6/2010 | Yao et al. | 360/245 |

(Continued)

FOREIGN PATENT DOCUMENTS

| | | |
|---|---|---|
| JP | 63-138618 | 6/1988 |
| JP | 11-39626 | 2/1999 |

(Continued)

OTHER PUBLICATIONS

Notification for Reasons of Refusal in Japanese Patent Application No. 2009-187747 dated Jan. 10, 2012.

(Continued)

*Primary Examiner* — Will J Klimowicz
(74) *Attorney, Agent, or Firm* — Sughrue Mion, PLLC (57) ABSTRACT

Disclosed are various techniques for reduction of the magnitude of the residual stress in the HDD gimbal circuits, or more specifically, the residual plastic strain. Various trace structures of the gimbal circuits as well as stress suppressors are utilized to achieve the reduction of the residual stress in the circuit.

2 Claims, 12 Drawing Sheets

(56) References Cited

U.S. PATENT DOCUMENTS

| | | |
|---|---|---|
| 7,898,772 B1 | 3/2011 | Ziaei et al. |
| 8,085,508 B2 | 12/2011 | Hatch |
| 8,089,731 B1* | 1/2012 | Ma et al. .................... 360/245.3 |
| 8,159,786 B2* | 4/2012 | Yao et al. ................... 360/245.9 |
| 8,218,269 B2* | 7/2012 | Zeng et al. .................... 360/255 |
| 2004/0181932 A1* | 9/2004 | Yao et al. ................... 29/603.03 |
| 2004/0240115 A1* | 12/2004 | Hutchinson et al. ....... 360/245.9 |
| 2005/0117257 A1* | 6/2005 | Thaveeprungsriporn et al. .............................. 360/246 |
| 2005/0248885 A1 | 11/2005 | Funada et al. |
| 2005/0280944 A1* | 12/2005 | Yang et al. ................. 360/245.9 |
| 2006/0262456 A1 | 11/2006 | Wang et al. |
| 2006/0291102 A1 | 12/2006 | Honda |
| 2008/0030900 A1 | 2/2008 | Zeng et al. |
| 2008/0030903 A1 | 2/2008 | Feng |
| 2008/0049361 A1 | 2/2008 | Kushima et al. |
| 2008/0123221 A1 | 5/2008 | Zeng et al. |
| 2008/0180850 A1* | 7/2008 | Rice et al. .................. 360/245.9 |
| 2009/0207529 A1* | 8/2009 | Yao ............................. 360/245.9 |
| 2009/0244786 A1 | 10/2009 | Hatch |
| 2011/0299196 A1 | 12/2011 | Zeng et al. |

FOREIGN PATENT DOCUMENTS

| | | |
|---|---|---|
| JP | 2005-115973 | 4/2005 |
| JP | 2005-322336 | 11/2005 |
| JP | 2007-012111 | 1/2007 |
| JP | 2008-41215 | 2/2008 |
| JP | 2008-135163 | 6/2008 |

OTHER PUBLICATIONS

U.S. Office Action issued in U.S. Appl. No. 12/495,323 dated Sep. 24, 2012.

US Non-Final Office Action issued in U.S. Appl. No. 12/495,323 dated Feb. 6, 2013.

Notification of Second Office Action issued in counterpart CN Application No. 200910162385.0 dated Nov. 22, 2012.

US Final Office Action issued in U.S. Appl. No. 12/495,323, dated Jun. 5, 2013.

* cited by examiner

Figure 5 - Gimbal Related Suspension Process Steps

COPPER RESIDUAL STRESS RELAXATION REDUCTION MEANS FOR HARD DISK DRIVE SLIDER GIMBALS

CROSS-REFERENCE TO RELATED APPLICATION

This application is a divisional application of, and claims priority to U.S. patent application Ser. No. 12/495,323 filed on Jun. 30, 2009, which claims priority from U.S. Provisional Patent Application No. 61/091,323 filed on Aug. 22, 2008, which is incorporated by reference in its entirety for all purposes as if fully set forth herein.

DESCRIPTION OF THE INVENTION

1. Field of the Invention

This invention generally relates to Hard Disk Drive design engineering and process optimization and more specifically to copper residual stress relaxation reduction for Hard Disk Drive slider gimbals.

2. Description of the Related Art

Hard Disk Drives (HDD) are normally utilized as data storage units in various computer and consumer electronics applications. Generally, HDDs operate by reading and writing digitized information onto multiple stacked rotating magnetic disks. This reading and writing is accomplished by a magnetic transducer "head" embedded on a "slider", made typically of Aluminum-Titanium Carbon, (ALTIC), which is mounted on a "suspension".

The read/write head assembly typically incorporates an electromagnetic transducer flown by an air bearing slider. This slider operates in a cooperative hydrodynamic relationship with a thin layer of air dragged along by the spinning discs to fly the head assembly in a closely spaced relationship to the disc surface. In order to maintain the proper flying relationship between the head assemblies and the discs, the head assemblies are attached to and supported by head suspensions. The entire structure of the slider and suspension is usually called the head gimbal assembly (HGA). In a typical design, the gimbal may include stainless steel gimbal struts with an attached flexible gimbal circuit board, composed of a polyimide layer and a copper layer, for carrying the electrical signals to and from the electromagnetic transducer.

In a typical HDD, the consistent fly height of the electromagnetic transducer over the surface of the magnetic disk drive is very important for long-term reliability of the data read and write operations of the HDD. On the other hand, residual stress in the copper layer of the suspension gimbal circuit board of an HDD can lead to long term drift in the pitch static attitude of the gimbal, adversely affecting the electromagnetic transducer fly height over the surface of the magnetic disk. This, in turn, adversely affects the reliability of the read/write operations performed by the HDD.

Thus, new ways for reducing the magnitude of the residual stress or residual plastic strain in HDD gimbal circuit boards are needed.

SUMMARY OF THE INVENTION

The inventive concept is directed to methods and systems that substantially obviate one or more of the above and other problems associated with conventional technology associated with instability in pitch attitude of the gimbal over time, temperature and handling processes, including ultrasonic cleaning.

One or more embodiments of the invention can provide reduction means for the magnitude of the residual stress in the HDD gimbal circuits, or more specifically, the residual plastic strain.

Aspects of the present invention include a hard disk drive (HDD) gimbal trace circuit characterized in reduced magnitude of the residual stress or residual plastic strain, the trace circuit including a plurality of traces, the plurality of traces forming a trace structure; a strut; and at least one stress suppressor, the at least one stress suppressor further comprising at least one island structure.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically.

DETAILED DESCRIPTION

In the following detailed description, reference will be made to the accompanying drawing(s), in which identical functional elements are designated with like names. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense.

One of the aspects of the present invention is directed towards overcoming instability in pitch attitude of the HDD gimbal over time, temperature and handling. The aforesaid instability in the pitch attitude of the HDD gimbal results in the instability of the electromagnetic transducer fly height over the surface of the magnetic disk and, consequently, reduced reliability of the read/write operations performed by the HDD. Accordingly, achieving the aforesaid stability in the gimbal pitch attitude is crucial to improving the performance reliability of the HDD.

In accordance with an embodiment of the inventive concept, a simulation method for stress relaxation was developed, which has been used to uncover the specific location of the plastic strain in the structure of the gimbal circuit board. Subsequently, several ways were conceived to circumvent the plastic strain by design of the geometry locally, opening the design space to include changes in any or all the polyimide, copper and stainless steel layers forming the gimbal. Third, the aforesaid simulation tool was exercised to discover which gimbal design solutions are most effective for overcoming the residual stress problem. This resulted in the gimbal designs most effective for overcoming the residual stress condition. The results are described below with reference to the specific exemplary embodiments of the improved gimbal configuration and illustrated in the accompanying drawings.

Using one or more of the aspects of the invention, the effects of the residual stress problem can be reduced and a more consistent and stable fly height of the slider and Read/Write transducer can be realized. Also, because pitch static attitude of the gimbal is a frequently measured (inspected) parameter, the manufacturing yields of the HDDs can be improved due to the inherent improved stability of the gimbal assembly.

Figure 1:
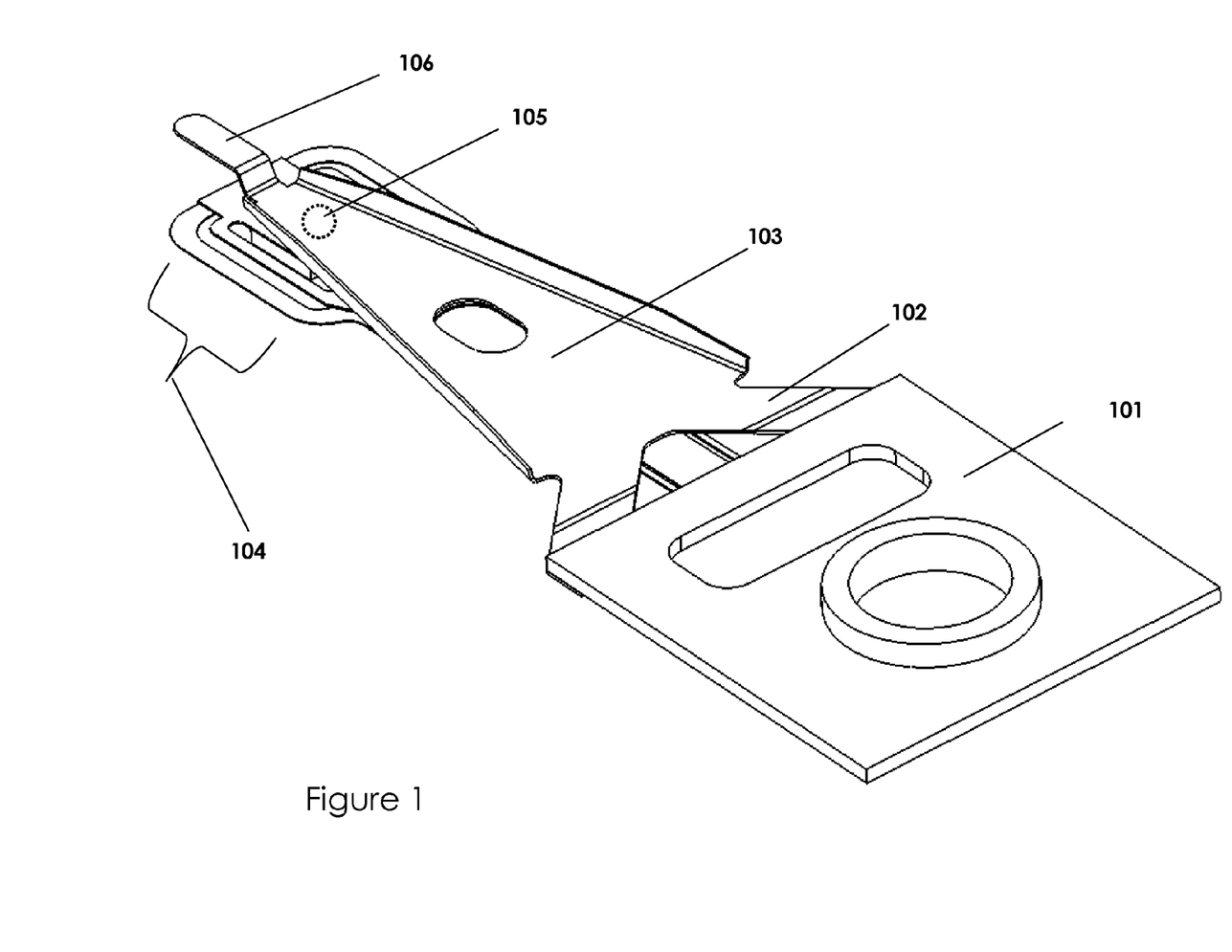
FIG. 1 illustrates exemplary components of a disk drive suspension viewed from above of the actuator arm.

FIG. 1 illustrates the exemplary components of a hard disk drive suspension viewed from above of the actuator arm. The transducer (not shown) is facing downward and hidden in this view. Typical constructions of the suspension include four components: baseplate 101, hinge 102, loadbeam 103 and trace/gimbal (or flexure circuit) 104. Some designs involve three component constructions, as shown, combining the hinge and loadbeam into one component. Such constructions can also include a load beam dimple with a dome protrusion downward 105, and a lift tab 106.

Figure 2:
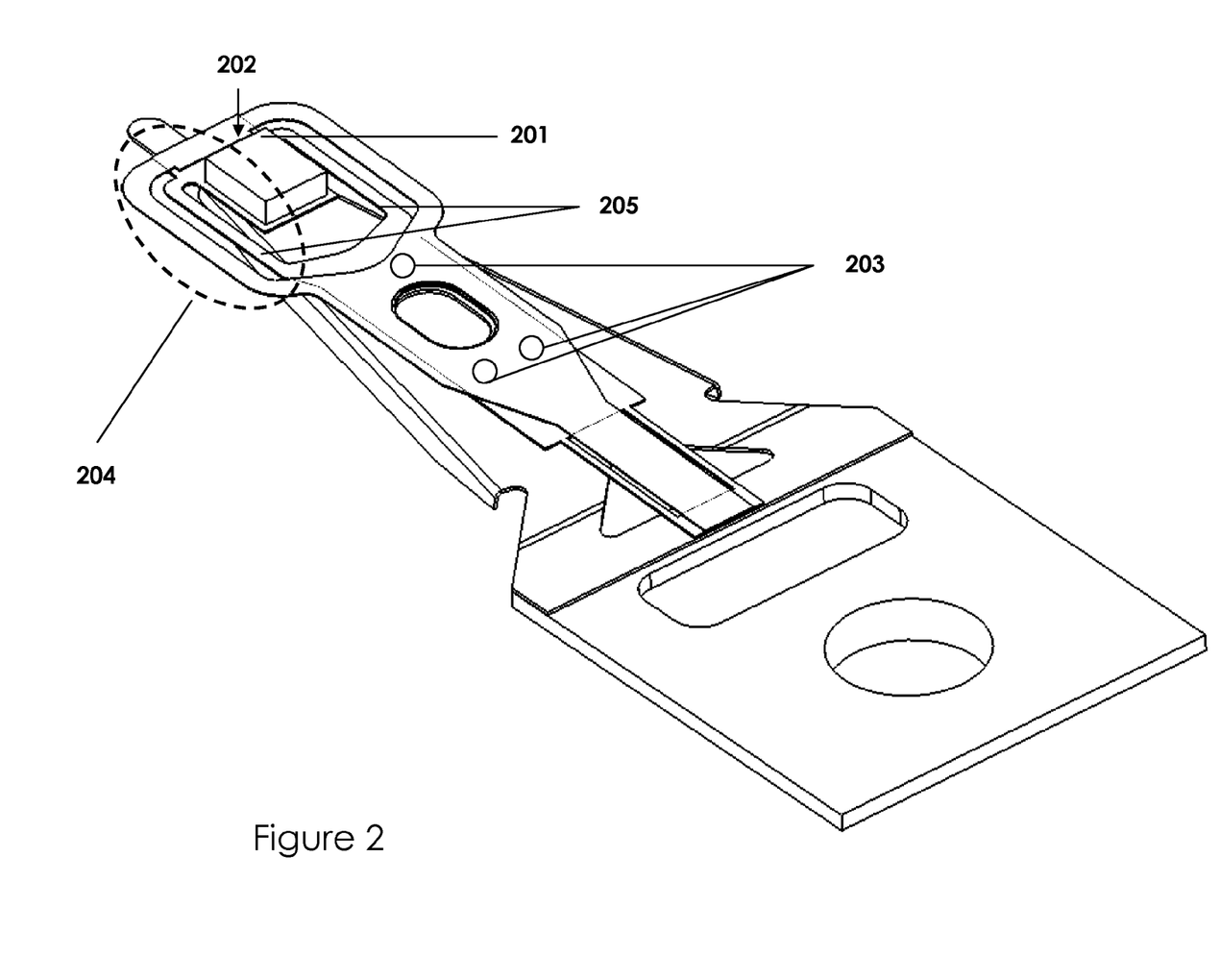
FIG. 2 illustrates the components of a disk drive suspension viewed from the surface of the magnetic disk drive.

FIG. 2 illustrates the components of a hard disk drive suspension as viewed from the surface of the magnetic disk. The slider 201 will house the read/write transducers at the trailing edge 202 of the Air Bearing Surface (ABS). Flexure welds 203 attached the circuit board to the loadbeam 103. The dotted line 204 and the gimbal struts 205 (preferably made of stainless steel) signify the region of focus for the various embodiments of the present invention.

Figure 3:
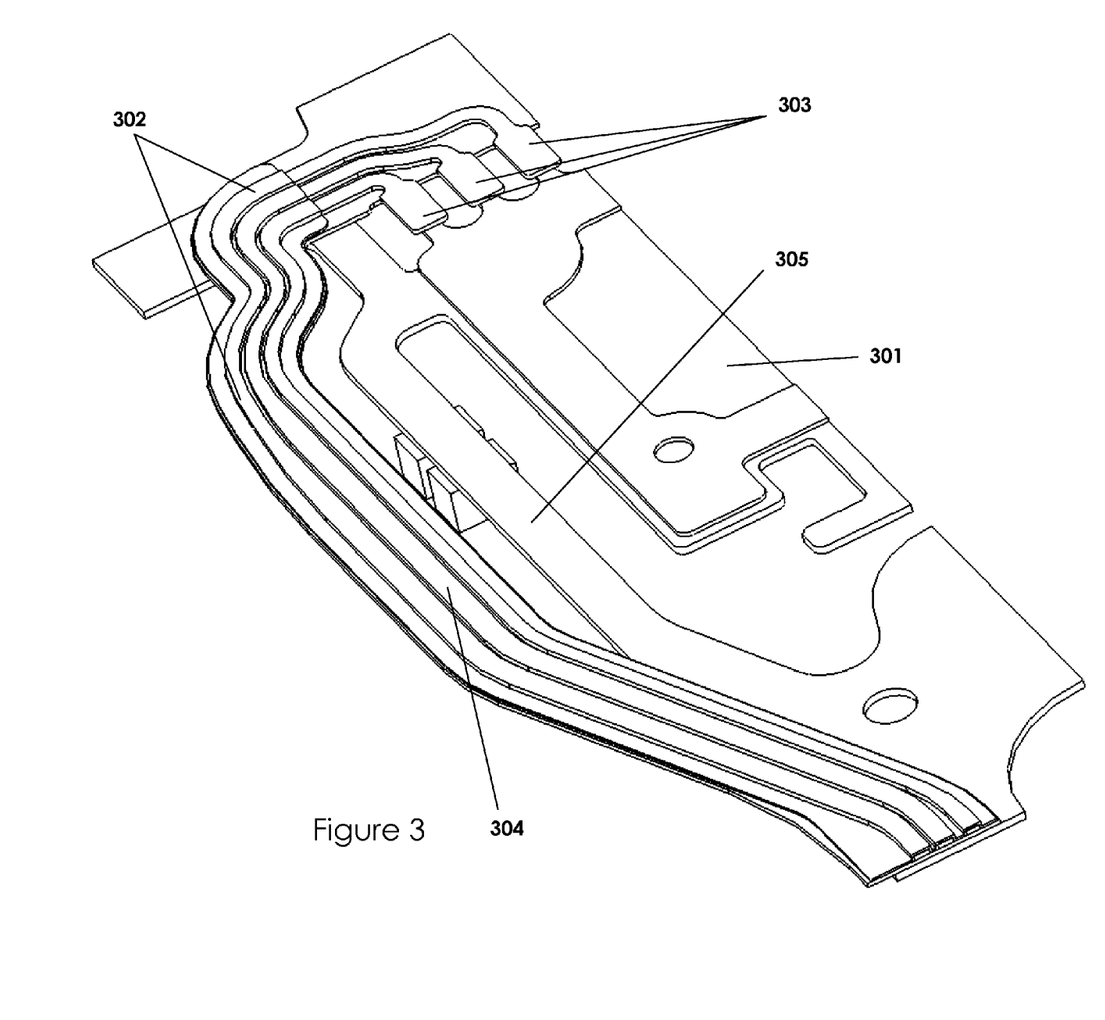
FIG. 3 illustrates a half symmetry model locally of the flexure tongue, copper trace circuit and SST struts, which provide the major portion of the gimbal stiffness.

FIG. 3 illustrates a half symmetry model locally of the flexure tongue 301, copper trace circuit with supporting polyimide struts 304 and SST struts 305, which provide the major contribution to the overall stiffness of the gimbal. Exposed copper pads and traces 303 accept solder connections to the slider/head (not shown). A polyimide coverlayer 302 on top of the copper traces exists for protection purposes.

Figure 4:
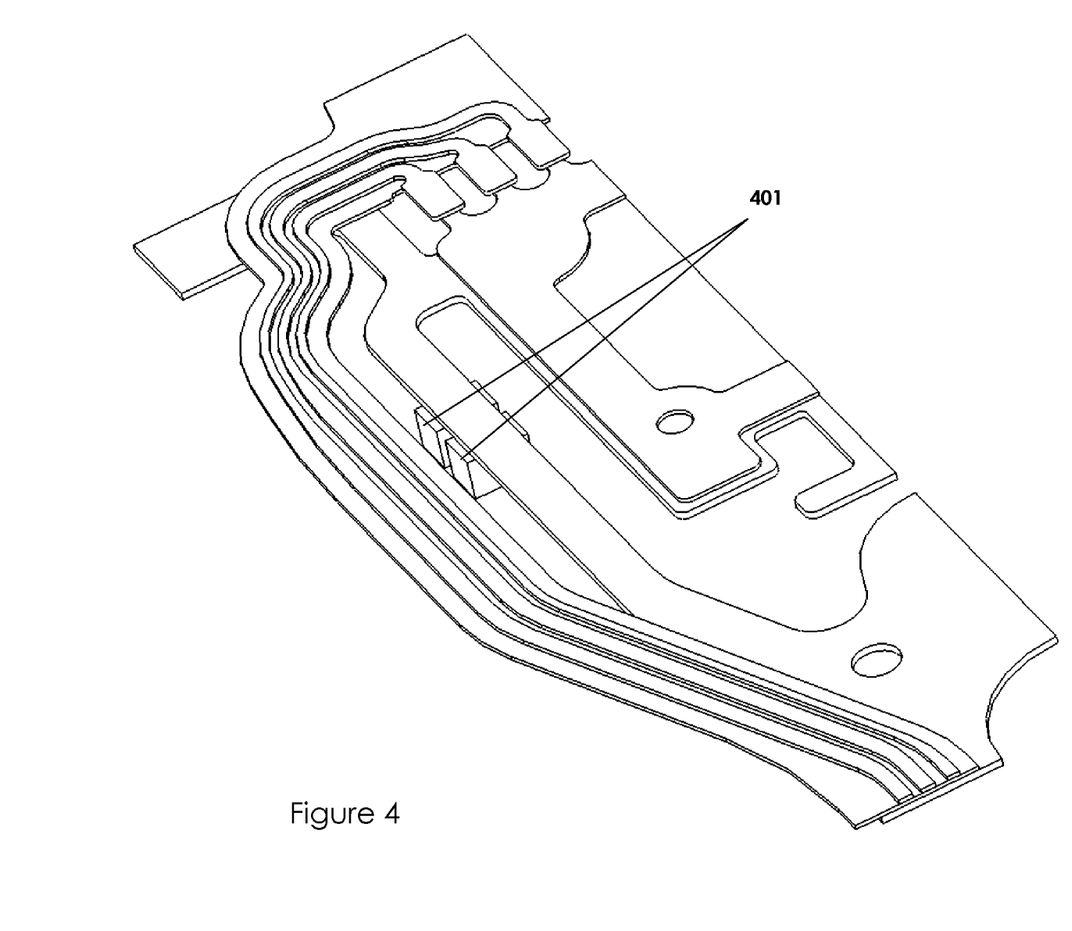
FIG. 4 illustrates the same structure as FIG. 3, except the protective coverlayer is hidden.

FIG. 4 illustrates the same structure as FIG. 3 except the coverlayer is hidden. Also depicted are forming jigs 401 that are used for simulation of the mechanical adjust process and necessary because of the finite dimple height. The gimbal flexure tongue is spaced off the load beam, in an angular fashion, by an amount equal to the dimple height, typically 50 to 70 microns. This defines the natural pitch angle of the flexure tongue, to which the slider bonds to. One of the forming jigs 401, is fixed, while the other rotates in order to permanently bend the SST strut 305 in FIG. 3.

Figure 5:
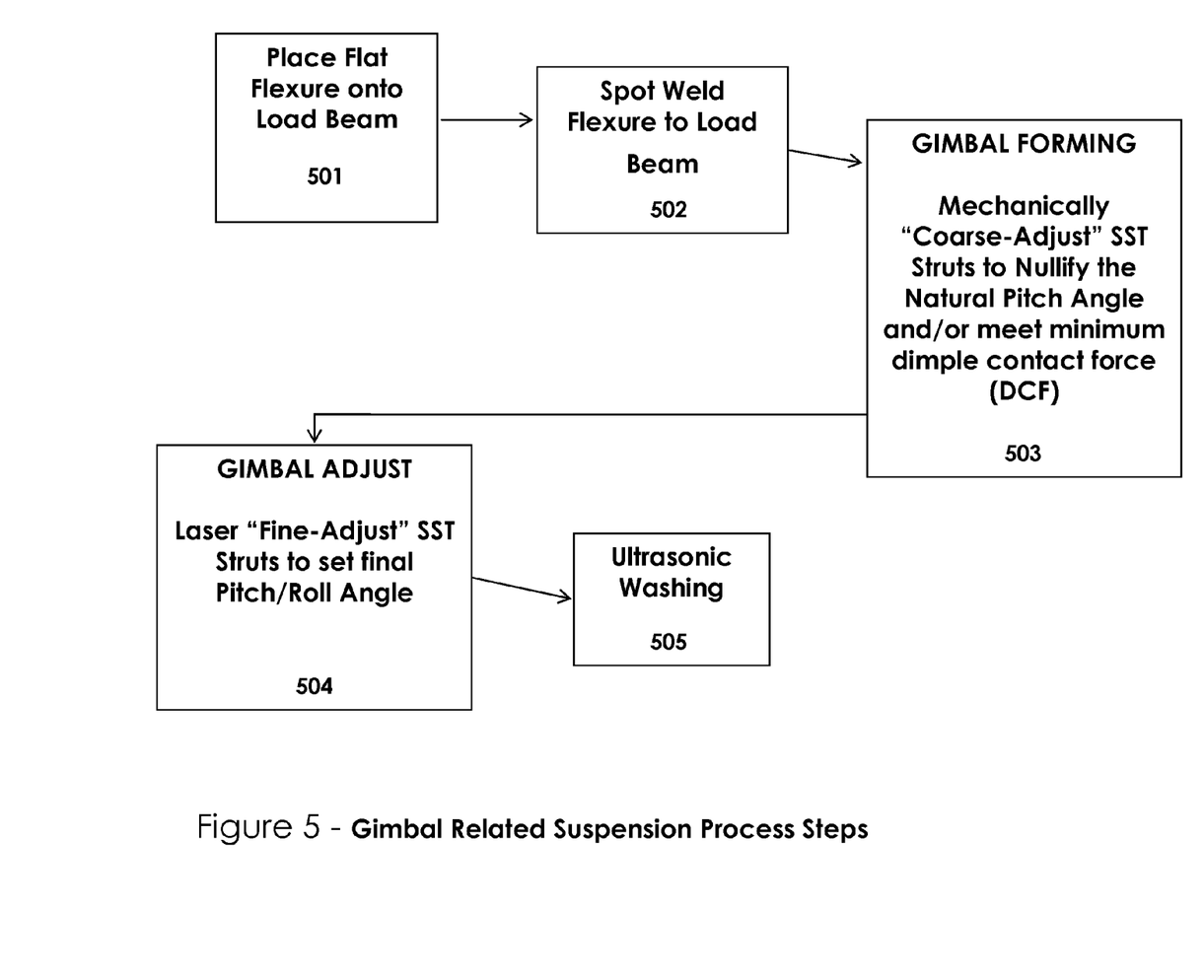
FIG. 5 illustrates the related necessary process steps for the suspension assembly, at least one of which, can result in copper trace plastic deformation.

FIG. 5 illustrates the related necessary process steps for the suspension assembly that result in copper trace plastic deformation. First, a flat flexure is placed onto a load beam 501. During this step, the flexure tongue will experience a natural pitch angle. The flexure is then spot welded to the load beam 502. The SST struts are then mechanically coarse-adjusted to nullify the natural pitch angle 503, and the copper will exhibit some permanent plastic behavior. Lasers fine-adjust the SST struts in order to set the final, optimal pitch/roll angle 504, wherein the residual copper stress/strain prevails. The pitch and roll static attitude (PSA/RSA) from this step onward must be stable with regards to handling, temperature and time. Subsequently, the flexure is subject to ultrasonic washing 505.

Very local plastic strain behavior of the gimbal results from the mechanical forming of the SST struts. The simulation details for studying this behavior are beyond the scope of this specification. The Finite Element Model (FEM) of the mechanical gimbal forming process nullifies the natural pitch angle. The object is to make the pitch angle relaxation less sensitive to the geometry of the local region.

The basic idea to reduce CU contribution to PSA stability is outlined by the process as follows. First, the location of copper plastic deformation is learned thru simulation. The traces are then thinned or widened locally, depending on the circumstances. Subsequently, the traces may need alternate routing to either an outer loop or into other shapes in order to reduce plastic behavior in the copper.

When examined, the plastic component of the strain is non-elastic, and results in a finite residual strain component contributing to undesirable pitch angle relaxation versus handling, ultrasonic cleaning, temperature and time.

Figure 6:
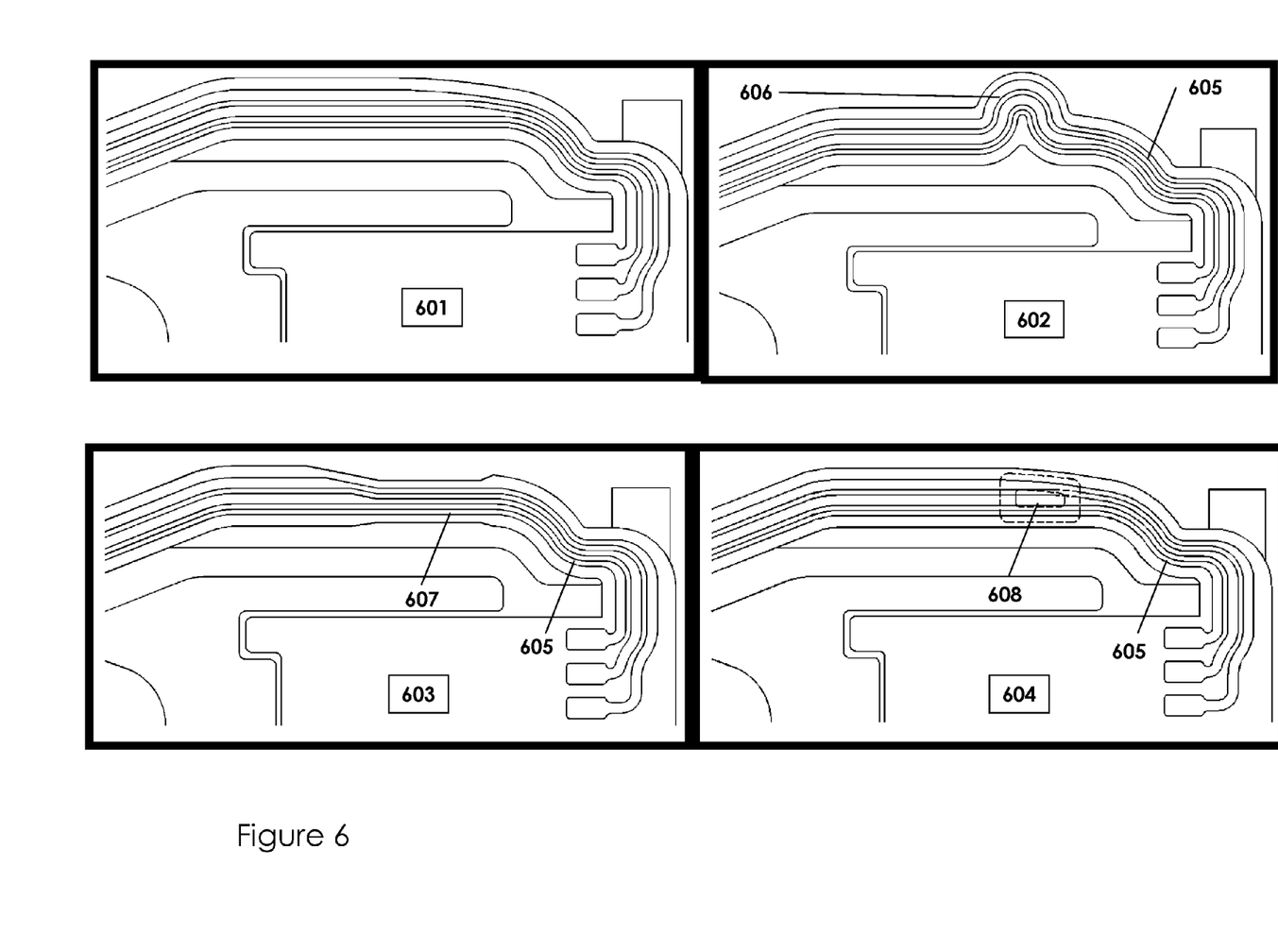
FIG. 6 illustrates a typical prior art construction of outrigger trace circuit and SST strut, an embodiment of the present invention with traces routed to circle outwards in order to reduce the residual plastic strain component, an embodiment with traces narrowed in order to reduce the residual plastic strain component, and an embodiment of this invention with a SST support member strategically located under the traces in order to reduce the residual plastic strain component.

FIG. 6 illustrates a typical prior art construction 601 of outrigger trace circuit and SST strut; an embodiment of the present invention 602 with traces 605 routed to circle outwards 606 in order to reduce the copper residual plastic strain component; an embodiment 603 with traces 605 narrowed 607 in order to reduce the copper residual plastic strain component; and an embodiment of this invention 604 with a SST support member strategically located under 608 the traces 605 in order to reduce the residual plastic strain component. These constructions are shown as an example, but should not limit the scope of materials that could be employed, or shapes that are possible in the spirit of this invention. These constructions may be implemented individually, or conjunction with each other in many combinations.

Figure 7:
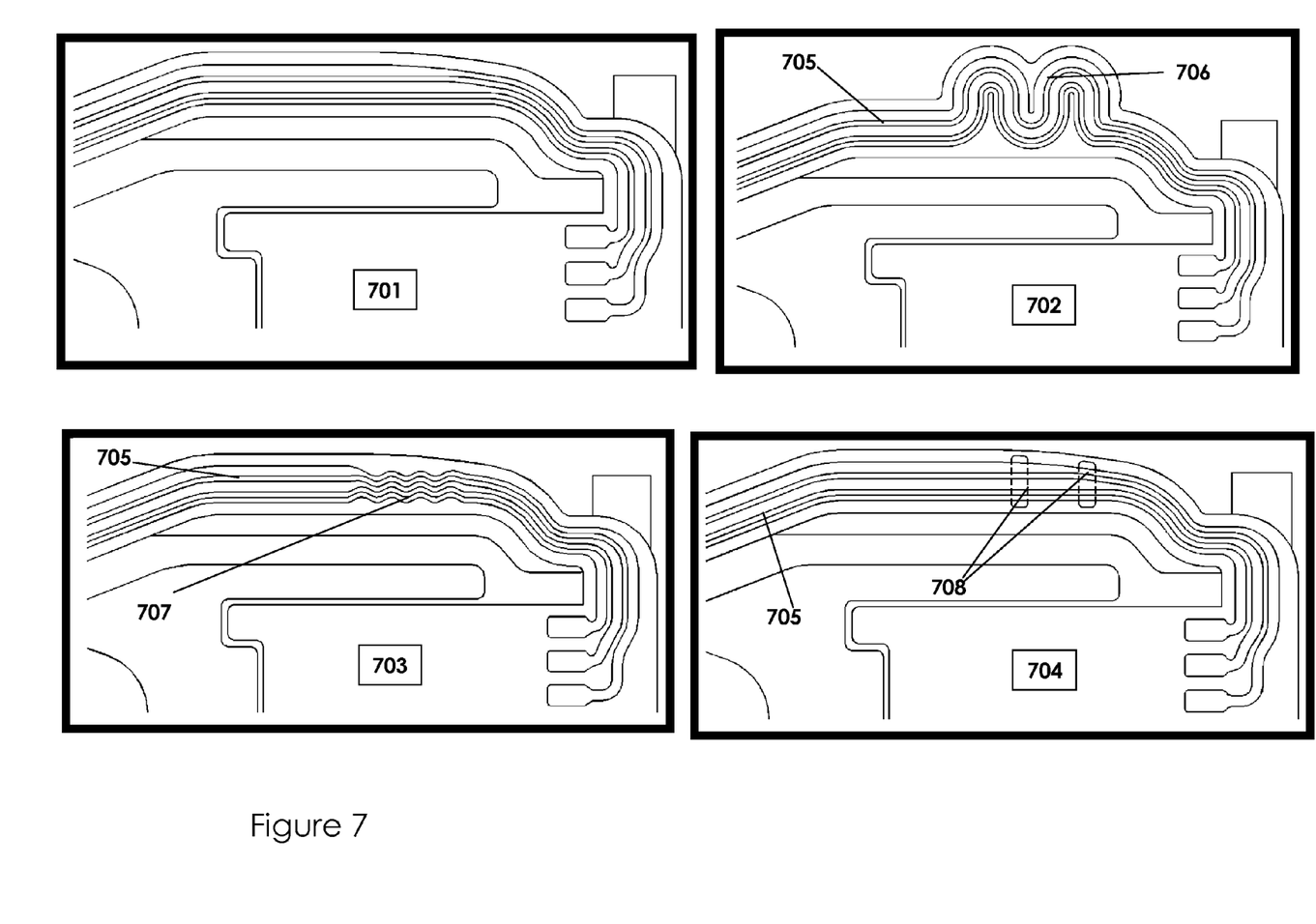
FIG. 7 illustrates a typical prior art construction of outrigger trace circuit and SST strut, an embodiment of the present invention with traces routed to circle outwards twice, in order to reduce the residual plastic strain component, an embodiment of the present invention with traces narrowed and with wave shapes in order to reduce the residual plastic strain component, and an embodiment of this invention with two SST support members strategically located under the traces in order to reduce the residual plastic strain component.

FIG. 7 illustrates a typical prior art construction 701 of outrigger trace circuit and SST strut ; an embodiment of the present invention 702 with traces routed to circle outwards twice; in order to reduce the residual plastic strain component, an embodiment of the present invention 703 with traces 705 narrowed and with wave shapes 707 in order to reduce the copper residual plastic strain component; and an embodiment of this invention 704 with two SST support members 708 strategically located under the traces 705 in order to reduce the copper residual plastic strain component.

Figure 8:
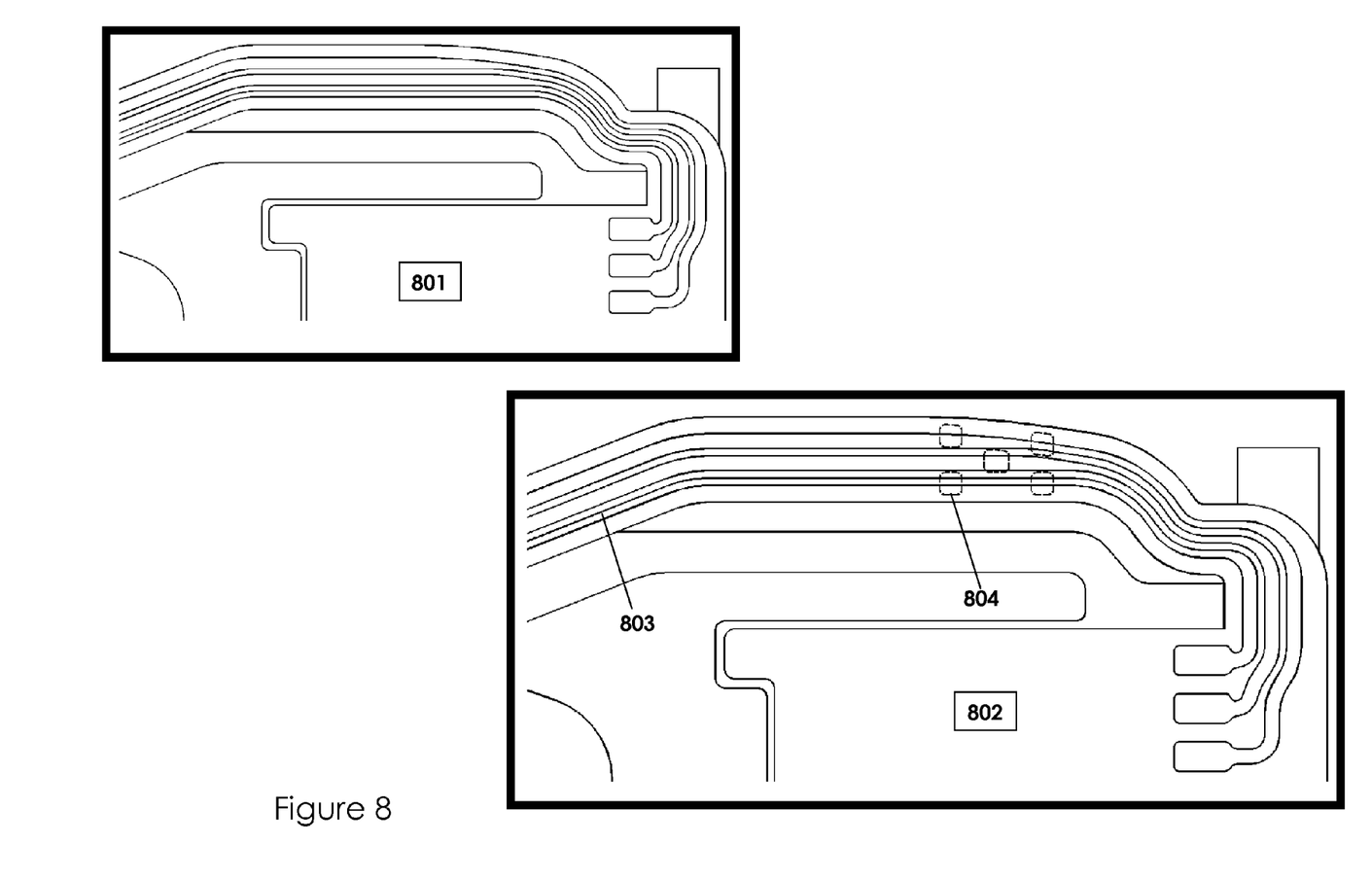
FIG. 8 illustrates a typical prior art construction of outrigger trace circuit and SST strut, and an embodiment of this invention with five SST support members strategically located under the traces in order to reduce the residual plastic strain component.

FIG. 8 illustrates a typical prior art construction of outrigger trace circuit and SST strut 800 and also illustrates an embodiment of the present invention 801 with five SST support members strategically located under the traces in order to reduce the residual plastic strain component. Any number of SST islands located under the copper high strain region, for example 4, 5, 6, or more, would be consistent within the concepts and spirit of various embodiments of the present invention.

Figure 9:
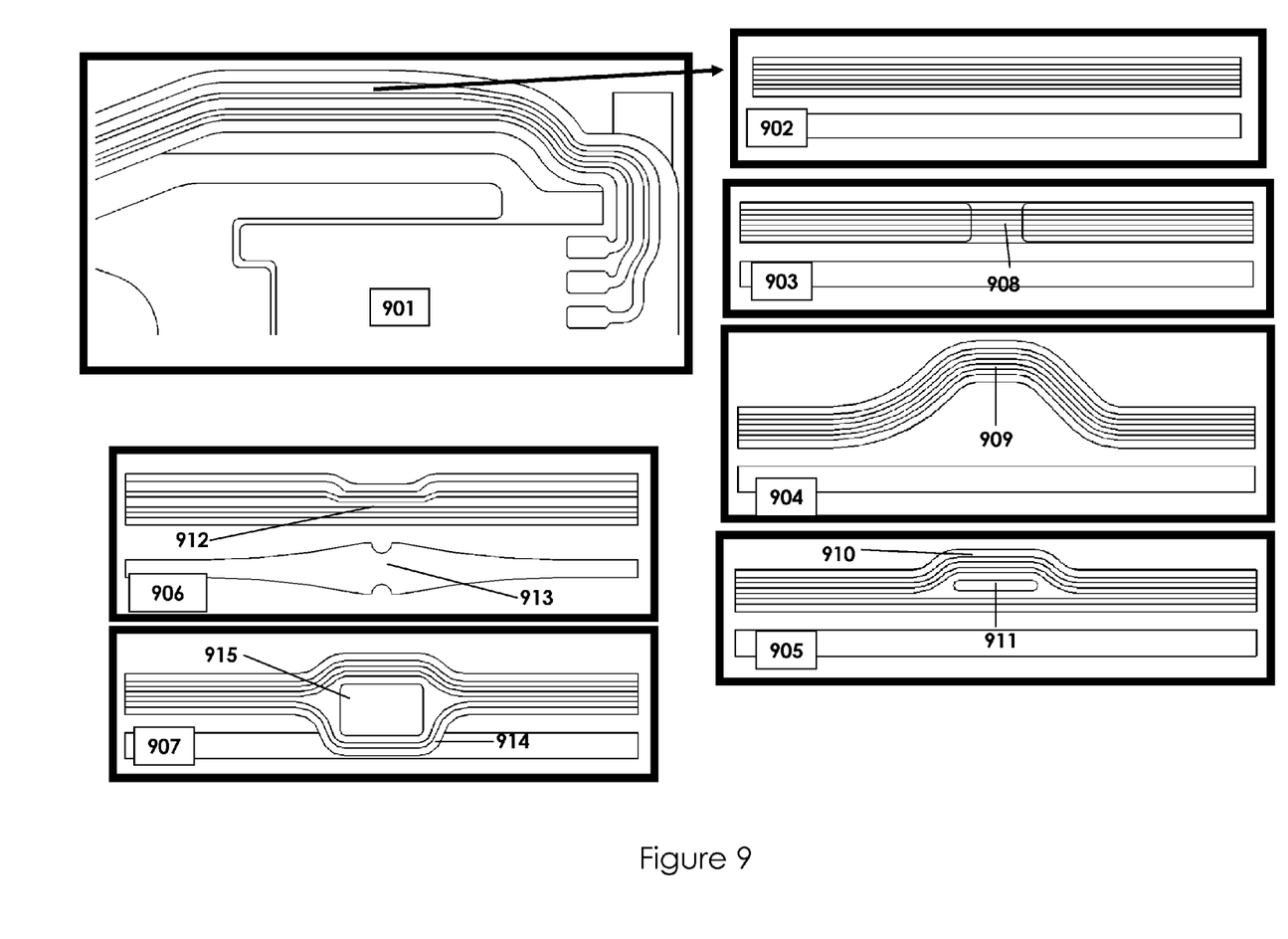
FIG. 9 illustrates various outrigger trace circuits with SST struts.

FIG. 9 illustrates various outrigger trace circuit configurations with SST struts. Configuration 901 shows a typical prior art construction of outrigger trace circuit and SST strut. Configuration 902 shows a typical prior art construction of outrigger trace circuit and SST strut, but a more simplified view. Configuration 903 illustrates an embodiment of the present invention with a coverlayer opening window 908 in order to reduce the residual plastic strain component. Configuration 904 illustrates an embodiment of the present invention with traces routed in a jog outward 909 in order to reduce the copper residual plastic strain component. Configuration 905 illustrates an embodiment of the present invention with some traces routed in a jog outward 910 to reduce the copper residual plastic strain component. A polyimide layer 911 window acts to separate these traces from the inner trace. Configuration 906 illustrates an embodiment of the present invention with traces narrowed 912 in order to reduce the copper residual plastic strain component. The SST strut 913, as shown, can also be widened and tapered to a narrower dimension. Configuration 907 illustrates an embodiment of this invention with some traces routed in a jog outward, but internal trace routes inward 914 onto the SST strut in order to reduce the copper residual plastic strain component. A polyimide layer window 915 acts to separate these traces from the inner trace.

Figure 10:
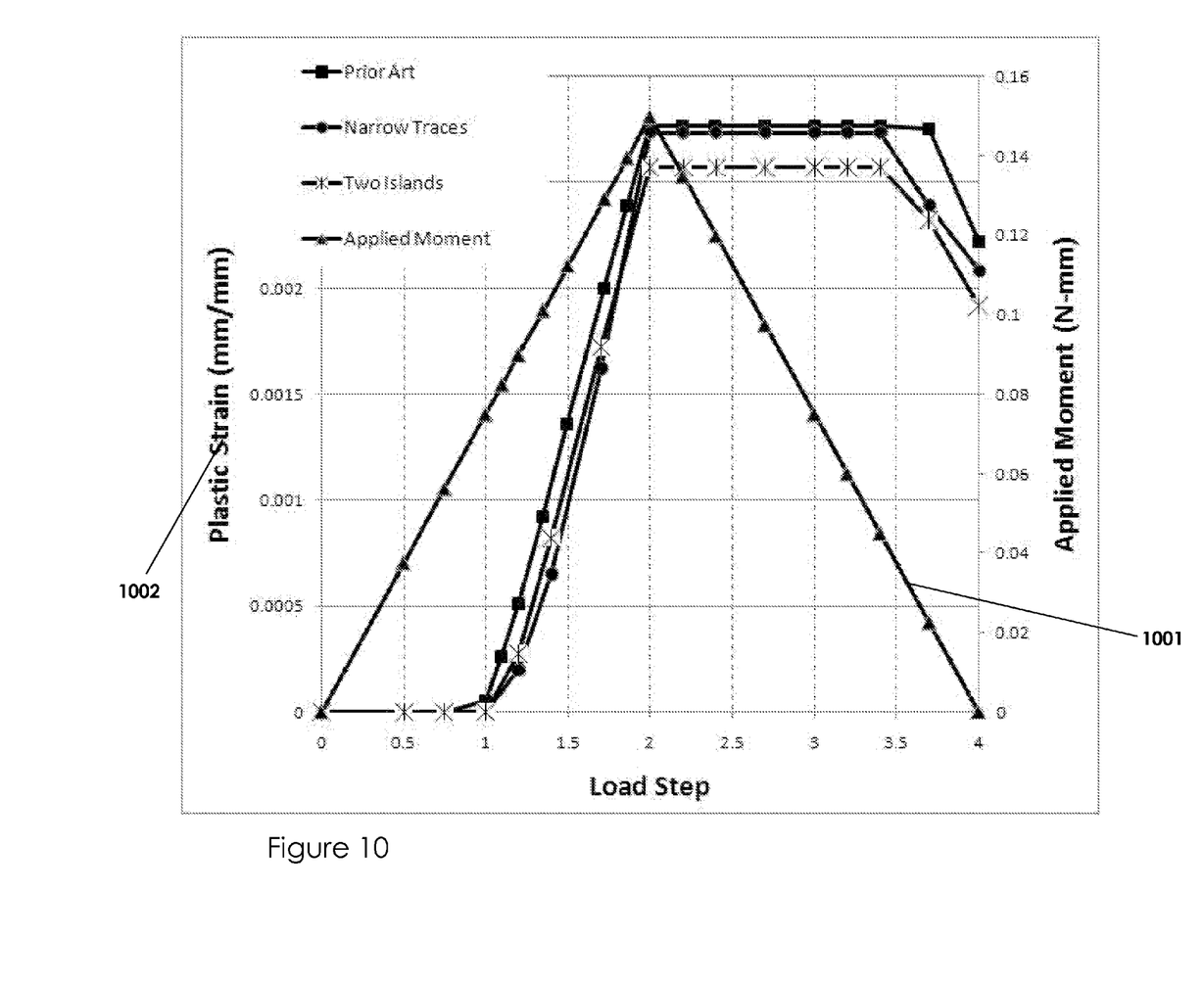
FIG. 10 illustrates various FEM results for plastic strain versus applied SST strut forming moment.

FIG. 10 illustrates various FEM results for plastic strain versus applied SST strut forming moment. The right hand y-axis depicts the magnitude of the applied moment in a 4 step time sequence. Jigs 401 of FIG. 4 are the recipient of this moment loading and the solid line depicted with triangles 1001 illustrates that this moment is ramped from zero, up to a value, and back to zero. The left hand y-axis 1002 represents the maximum plastic component of strain in the copper traces 303 in FIG. 3, so the figure of merit for any design will be the residual plastic strain when the moment load is released, or brought to zero, or after load step #4. Two examples are given.

Figure 11:
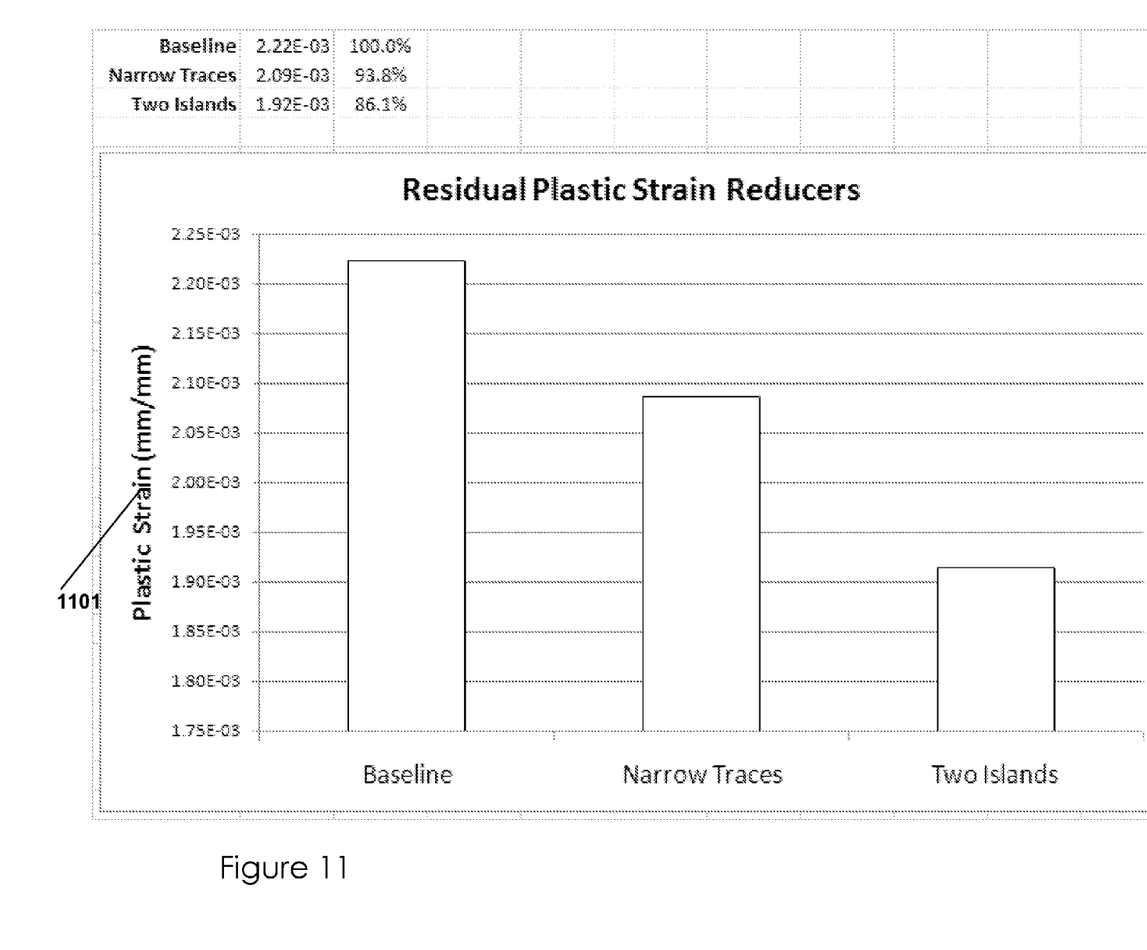
FIG. 11 illustrates various FEM results for residual plastic strain after forming.

FIG. 11 summarizes the various FEM results for copper residual plastic strain after forming. The y-axis 1101 is the same as described in FIG. 10.

Figure 12:
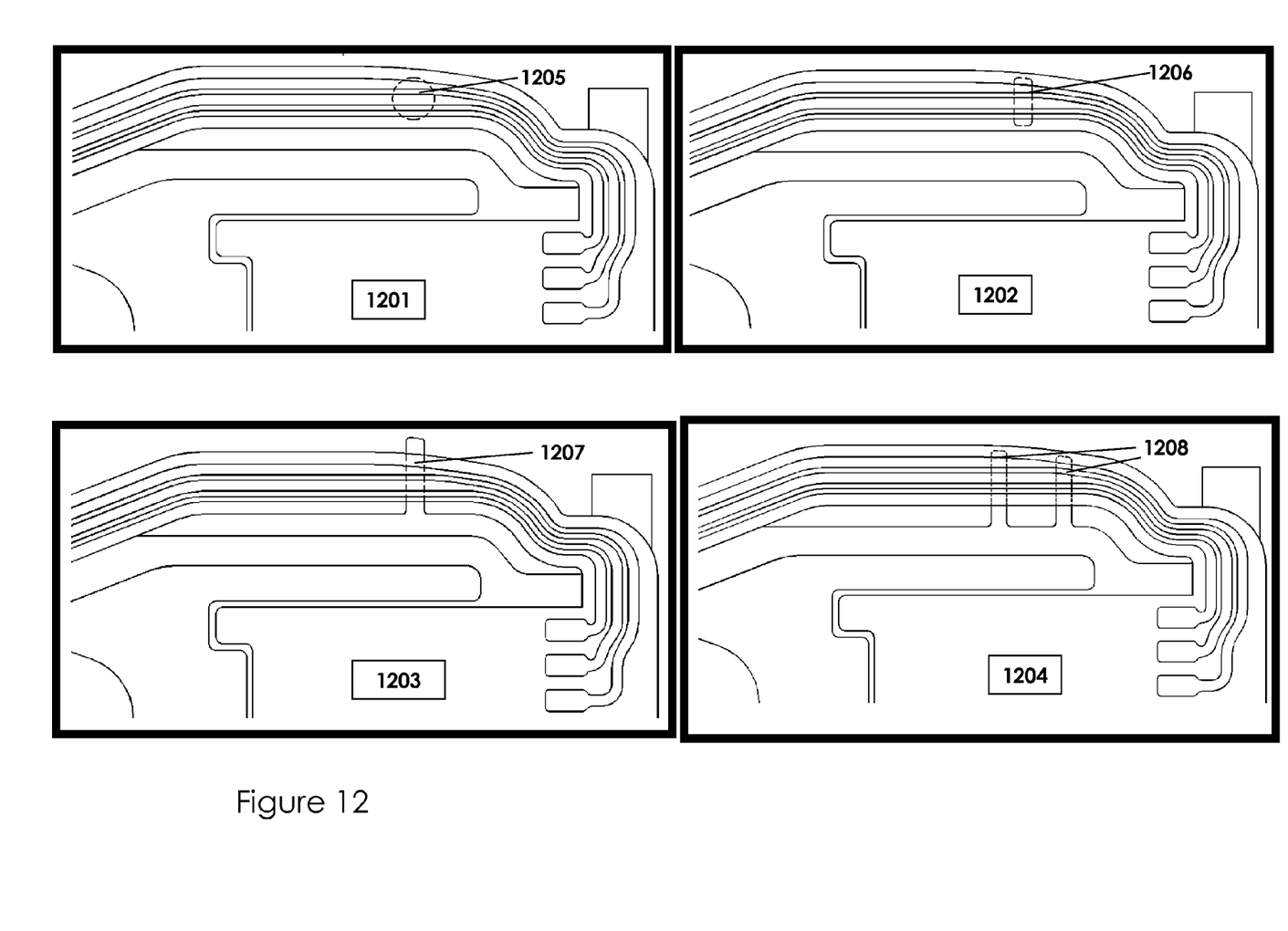
FIG. 12 illustrates various embodiments of the present invention in regard to the SST support strut member and its location, as compared to the prior art.

FIG. 12 illustrates various embodiments of the present invention in regards to the SST support member and its location. Configuration 1201 illustrates an embodiment of this invention with one circular SST support member 1205 strategically located under the traces high strain region in order to reduce the residual plastic strain component. Configuration 1202 illustrates an embodiment of this invention with one rectangular SST support member 1206 strategically located under the copper traces of the high strain region in order to reduce the residual plastic strain component. Configuration 1203 illustrates an embodiment of this invention with one rectangular SST support member 1207 strategically located under the traces high strain region in order to reduce the residual plastic strain component. This rectangular island connects to the inner SST strut rather than being an isolated island as in 1202. Configuration 1204 illustrates an embodiment of this invention with two rectangular SST support members 1208 strategically located to straddle the traces high strain region in order to reduce the residual plastic strain component. These rectangular islands connect to the inner SST strut rather than being isolated. An obvious variation of this configuration is to have one island connect to strut and the other not connect, and vice versa.

As it would be appreciated by those of skill in the art, other implementations of the invention will be apparent from consideration of the specification and practice of the invention disclosed herein. Various aspects and/or components of the described embodiments may be used singly or in any combination in the structures for reducing residual stress in gimbal trace circuits. It is intended that the specification and examples be considered as exemplary only, with a true scope and spirit of the invention being indicated by the following claims and their equivalents.

What is claimed is:

1. A hard drive (HDD) gimbal trace circuit characterized in reduced magnitude of the residual stress or residual plastic strain, the trace circuit comprising:

a plurality of traces, the plurality of traces forming a trace structure; and a strut extending substantially along a longitudinal axis configured to support a transducer, the trace structure has a proximal end portion extending outboard and substantially parallel to the strut, and a distal end portion extending outboard and substantially parallel to the strut, wherein the plurality of traces have a high strain region deformed from mechanical-coarse adjustment of the strut;

wherein the trace structure has, at the high strain region defined from the mechanical course adjustment of the strut, a characteristic shape of either an outward circle shape or a double outward circle shape; wherein the characteristic shape of either an outward circle shape or a double outward circle shape of the trace structure lies between the proximal end portion of the trace structure and distal end portion of the trace structure.

2. The hard drive (HDD) gimbal trace circuit of claim 1, wherein the strut is configured to nullify a natural pitch angle of a flexure from the mechanical-course adjustment of the strut.

* * * * *